F. S. BUCKMINSTER.
WATCHMAKER'S MAGNIFYING GLASS.
APPLICATION FILED NOV. 9, 1917.
1,272,911.
Patented July 16, 1918.
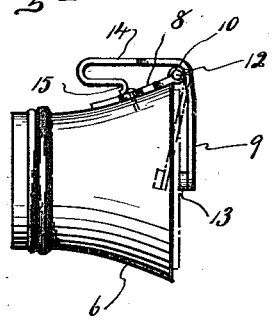
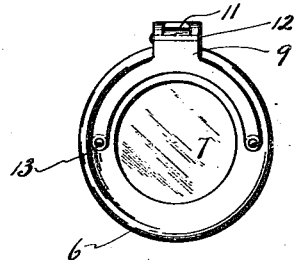
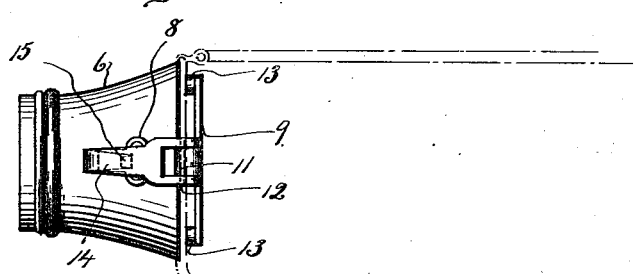
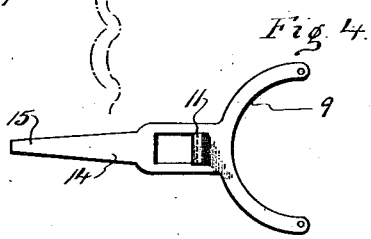
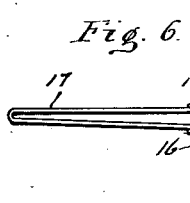
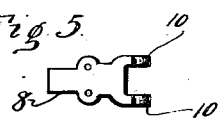

UNITED STATES PATENT OFFICE.

FRANK S. BUCKMINSTER, OF WATERBURY, CONNECTICUT.

WATCHMAKER'S MAGNIFYING-GLASS.

1,272,911. Specification of Letters Patent. Patented July 16, 1918.

Application filed November 9, 1917. Serial No. 201,053.

*To all whom it may concern:*

Be it known that I, FRANK S. BUCKMINSTER, a citizen of the United States, residing at Waterbury, in the county of New Haven and State of Connecticut, have invented a new and useful Improvement in Watchmakers' Magnifying-Glasses; and I do hereby declare the following, when taken in connection with the accompanying drawings and the characters of reference marked thereon, to be a full, clear, and exact description of the same, and which said drawings, constitute part of this application, and represent, in—

Figure 1 a side view of a magnifying glass holder constructed in accordance with my invention.

Fig. 2 a rear end view of the same.

Fig. 3 a top or plan view showing a magnifying glass holder engaged with a spectacle lens.

Fig. 4 a plan view of the yoke member before it is bent into form.

Fig. 5 a plan view of the hinge plate, detached.

Fig. 6 a plan view of the yoke member as formed from wire.

This invention relates to an improvement in watch-makers' magnifying glass or loop such as is commonly held in place by the muscles of the eye, and the invention particularly refers to magnifying glass holders adapted to be held by the muscles of the eye or engaged with the lens of a pair of spectacles if the user wears spectacles, the object being to provide means by which a magnifying glass may be readily engaged with the lens of the spectacles or retired so as not to interfere with its use by being held by the muscles of the eye; and the invention consists in the construction hereinafter described and particularly recited in the claims.

In carrying out my invention I employ a magnifying glass holder 6 of substantially usual construction and provided with the usual magnifying glass 7. Secured to the outer face of the top is a hinge plate 8. Hinged to this plate is a yoke 9. As herein shown the plate 8 is formed at its outer end with knuckles 10, and the yoke with a knuckle 11 which is held between the knuckles 10 by a pin 12. This yoke is curved corresponding to the curvature of the holder and is of such dimensions that its lower ends will swing into the holder as indicated in broken lines in Fig. 1. The ends of this yoke are provided with pads 13 and the yoke is formed with a forwardly extending tail 14 which is bowed so that its end 15 will bear upon the hinge plate 8, and this tail is formed from spring metal. If the user of the magnifying glass wears spectacles, he will press down upon the tail 14 which will move the yoke away from the holder so as to allow the yoke to pass inside the spectacle lens, while the magnifying glass holder passes outside the lens as indicated in Fig. 3 of the drawings. When the tail is released the spring will clamp the pads 13 against the lens so as to firmly hold the magnifying glass in position. If the user of the magnifying glass does not wear spectacles, the device is applied to the eye in the usual manner of watch-makers' magnifying glass or loop, the yoke swinging into the holder so as not to interfere with the use of the magnifying glass.

Instead of forming the yoke from sheet metal, it may be formed from spring wire, as indicated in Fig. 6. The wire is doubled to form a tail 17 and with coils forming knuckles 16 for the hinge pin by which the yoke is hinged to the plate 8.

My improved device may be applied to an ordinary magnifying glass holder or loop, and while providing means for attaching the holder to the spectacle lens does not interfere with its ordinary use.

I claim:—

1. The combination with a magnifying glass holder, of a clamping device comprising a yoke hinged to the holder, the yoke formed with a forwardly projecting spring tail.

2. The combination with a magnifying glass holder, of a hinge plate secured to the holder, a yoke hinged to said plate, said yoke provided at its ends with pads and formed with a forwardly projecting bowed tail the end of which bears upon the said plate.

In testimony whereof I have signed this specification in the presence of two subscribing witnesses.

FRANK S. BUCKMINSTER.

Witnesses:
W. E. A. O'ROURKE,
ADELINE C. MOSS.